United States Patent
Nanba et al.

(10) Patent No.: US 9,423,415 B2
(45) Date of Patent: Aug. 23, 2016

(54) SENSOR STATE DETERMINATION SYSTEM

(75) Inventors: Koichiro Nanba, Nagoya (JP);
Nobuyuki Okada, Okazaki (JP);
Takahiro Sasauchi, Toyokawa (JP);
Tatsuya Mita, Aichi (JP); Tomohiro Otsuka, Gifu (JP); Tomonori Goto, Nagoya (JP); Yasuki Nakakura, Narashino (JP); Naoki Tokuda, Hamamatsu (JP)

(73) Assignees: NIPPON SHARYO, LTD., Aichi (JP);
CENTRAL JAPAN RAILWAY COMPANY, Aichi (JP)

( * ) Notice: Subject to any disclaimer, the term of this patent is extended or adjusted under 35 U.S.C. 154(b) by 108 days.

(21) Appl. No.: 14/356,081

(22) PCT Filed: Feb. 7, 2012

(86) PCT No.: PCT/JP2012/052725
§ 371 (c)(1),
(2), (4) Date: May 2, 2014

(87) PCT Pub. No.: WO2013/118253
PCT Pub. Date: Aug. 15, 2013

(65) Prior Publication Data
US 2014/0297096 A1    Oct. 2, 2014

(51) Int. Cl.
*B61F 5/24* (2006.01)
*G01P 21/00* (2006.01)
*G01D 3/08* (2006.01)

(52) U.S. Cl.
CPC . *G01P 21/00* (2013.01); *B61F 5/24* (2013.01); *G01D 3/08* (2013.01)

(58) Field of Classification Search
CPC ......... B61F 5/24; F02D 11/106; B60T 7/042; B60T 8/885; B60T 13/741; B60T 7/22; G05B 23/024

USPC ........... 701/30.3; 702/184; 303/114.1, 122, 3, 303/193; 700/80
See application file for complete search history.

(56) References Cited

U.S. PATENT DOCUMENTS 6,276,763 B1 * 8/2001 Isono ..................... B60T 7/042
188/358
6,317,674 B1   11/2001 Lohberg et al.
(Continued)

FOREIGN PATENT DOCUMENTS

| JP | 2000-272498 A | 10/2000 |
| JP | 2001-271872 A | 10/2001 |

(Continued)

OTHER PUBLICATIONS

International Search Report for PCT/JP2012/052725 dated May 1, 2012.
(Continued)

*Primary Examiner* — Yuri Kan
(74) *Attorney, Agent, or Firm* — Sughrue Mion, PLLC (57) ABSTRACT

This sensor state determination system is a sensor state monitoring system capable of accurately determining whether or not a detecting sensor used with a railroad vehicle is in an abnormal state. This system includes: a detecting sensor capable of detecting a physical value acting upon the railroad vehicle; and an electronic control device. A monitoring sensor equivalent to the detection sensor is installed at a position equivalent to the position of the detection sensor. The electronic control device is provided with a determination means (coherence calculation section, state determination section) that computes, based on a first signal detected by the detecting sensor and a second signal detected by the monitoring sensor, a coherence value indicating a correlation between the signals. The electronic control device determines that the detecting sensor is in an abnormal state if the coherence value is smaller than a preset abnormality determination value.

4 Claims, 4 Drawing Sheets

(56) References Cited

U.S. PATENT DOCUMENTS

| | | | |
|---|---|---|---|
| 6,378,961 B1* | 4/2002 | Hara | B60T 7/22 180/169 |
| 2004/0098228 A1* | 5/2004 | Hartrey | F02D 11/106 702/184 |
| 2004/0184507 A1 | 9/2004 | Tsukamoto et al. | |
| 2005/0151419 A1* | 7/2005 | Watanabe | B60T 8/885 303/122 |
| 2007/0126281 A1* | 6/2007 | Zumberge | B60T 13/741 303/3 |
| 2011/0098975 A1 | 4/2011 | Mazzaro et al. | |
| 2012/0041575 A1* | 2/2012 | Maeda | G05B 23/024 700/80 |

FOREIGN PATENT DOCUMENTS

| | | |
|---|---|---|
| JP | 2003-270193 A | 9/2003 |
| JP | 2004-251189 A | 9/2004 |
| JP | 2006-312945 A | 11/2006 |
| JP | 2007-245819 A | 9/2007 |
| JP | 2008209229 A | 9/2008 |
| JP | 2011-058979 A | 3/2011 |
| JP | 2012-026897 A | 2/2012 |
| WO | 2011/111174 A1 | 9/2011 |

OTHER PUBLICATIONS

Communication dated Jul. 13, 2015 from the European Patent Office issued in corresponding European application No. 12868259.8.

* cited by examiner

XX: Abnormality Signal
YY: Normality Signal

SENSOR STATE DETERMINATION SYSTEM

CROSS-REFERENCE TO RELATED APPLICATIONS

This is a national phase of PCT International Patent Application No. PCT/JP2012/052725 filed Feb. 7, 2012, incorporated herein by reference in its entirety.

TECHNICAL FIELD

The present invention relates to a sensor state determination system to determine whether or not an acceleration sensor or the like to be used in a railroad or railway vehicle is in an abnormal state during running of the railroad vehicle.

BACKGROUND ART

A railroad vehicle uses an accelerator sensor or the like in a vibration damping control system for actively controlling a damper unit, a state monitoring system for monitoring the state of a component or the ride quality, and others. For instance, the vibration damping control system is arranged to execute active damper control in such a manner that the acceleration sensor detects vibration acceleration acting on a vehicle body, and a control unit appropriately determines a damping force to be generated by the damper unit based on the detected vibration acceleration.

The aforementioned vibration damper control system is disclosed in for example Patent Document 1 listed below. In the vibration damper control system disclosed in Patent Document 1 mentioned below, the control unit normally executes the active damper control as described above. However, in case the detected vibration acceleration exceeds a threshold value, the control system is determined to be in an abnormal state and the active damper control is unexecuted. This prevents the ride quality from deteriorating due to execution of the active damper control while a vehicle body is excessively vibrating.

RELATED ART DOCUMENTS

Patent Documents

Patent Document 1: JP-A-2001-271872

SUMMARY OF INVENTION

Problems to be Solved by the Invention

Meanwhile, in the vibration damping control system disclosed in Patent Document 1 listed above, the active damper control is executed based on the detected vibration acceleration on the precondition that the acceleration sensor is in a normal state, but this precondition does not take into consideration a case where the acceleration sensor itself is broken. Specifically, in case the acceleration sensor itself is broken or malfunctioning, the active damper control is performed based on a signal of the acceleration sensor in an abnormal state. Thus, the vibration damping control could not be conducted appropriately. Accordingly, it is desired to accurately determine first whether or not the acceleration sensor is in an abnormal state.

The present invention has been made to solve the above problems and has a purpose to provide a sensor state determination system capable of accurately determining whether or not a detecting sensor such as an acceleration sensor used in a railroad vehicle is in an abnormal state during running of the railroad vehicle.

Means of Solving the Problems

To achieve the above purpose, one aspect of the invention provides a sensor state determination system to determine whether or not a detecting sensor capable of detecting a physical value acting on a railroad vehicle is in an abnormal state during running of the railroad vehicle, wherein a monitoring sensor equivalent to the detecting sensor is installed in a location equivalent to a location in which the detecting sensor is installed, and the system includes a determination means configured to calculate a coherence value representing a correlation between a first signal detected by the detecting sensor and a second signal detected by the monitoring sensor based on both the signals, and determine that the detecting sensor is in an abnormal state when the coherence value is smaller than an abnormality determination value set in advance.

The determination means of the above sensor state determination system is preferably is configured to determine that the detecting sensor is in an abnormal state when a condition that the coherence value is smaller than the abnormality determination value has been established multiple times in succession.

The determination means of the above sensor state determination system is preferably is configured to determine that the detecting sensor is in an abnormal state when a condition that the coherence value is always smaller than a normality determination value for a short time from start of running of the railroad vehicle.

Advantageous Effects of the Invention

According to the invention, accordingly, the monitoring sensor equivalent to the detecting sensor is installed in the location equivalent to the location in which the detecting sensor is installed. When the coherence value indicating the correlationship between the first signal and the second signal is smaller than the abnormality determination value, the detecting sensor is determined to be in an abnormal state. Specifically, the first signal and the second signal are compared in shape with each other based on the coherence value and, based on this comparison, it is determined whether or not the detecting sensor is in an abnormal state. Thus, the first signal and the second signal can be compared strictly, thereby enabling accurate determination about whether or not the detecting sensor is abnormal.

MODE FOR CARRYING OUT THE INVENTION

Figure 1:
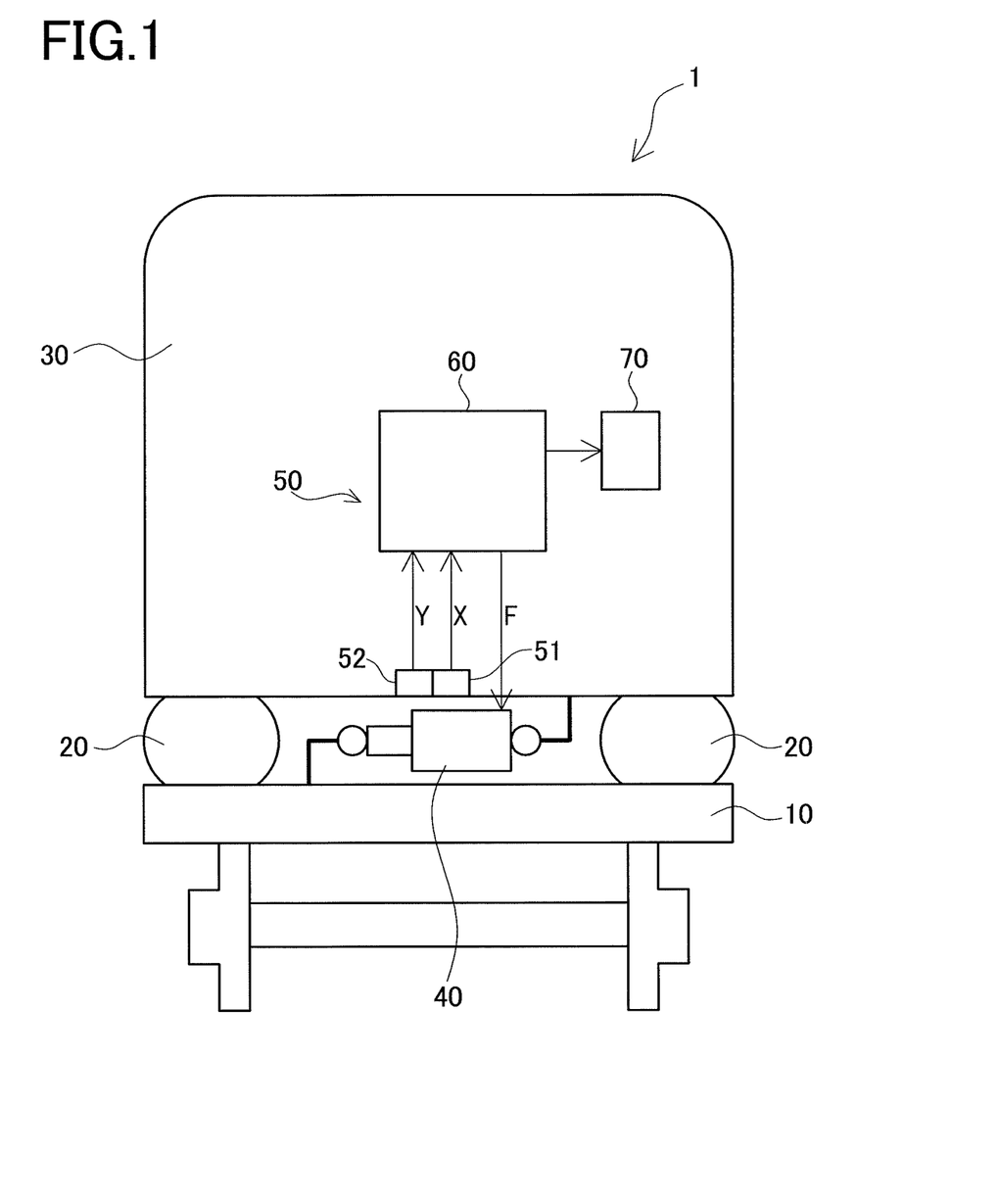
FIG. 1 is a front view conceptually showing a railroad vehicle employing a sensor state determination system.

A detailed description of a sensor state determination system in one embodiment of the present invention will now be given referring to the accompanying drawings. FIG. 1 is a front view conceptually showing a railroad vehicle 1 employing a sensor state determination system 50. In this railroad vehicle 1, a vehicle body 30 is mounted on two bogies 10 arranged in a front-back direction through air springs 20. Further, a damper unit 40 is provided to attenuate rightward and leftward vibrations acting on the vehicle body 30. The damper unit 40 is configured to adjust an opening degree of an electromagnetic valve not shown based on a damper control command value F input from an electronic control unit (ECU) 60 to adjust a damping force to be generated.

The sensor state determination system 50 is arranged to determine the state of an acceleration sensor. This sensor state determination system 50 includes, as shown in FIG. 1, a detecting sensor 51 which is an acceleration sensor capable of detecting vibration acceleration acting on the vehicle body 30, a monitoring sensor 52 which is an equivalent acceleration sensor configured to output the same values as those output from the detecting sensor 51, and the aforementioned ECU 60.

The detecting sensor 51 is provided to execute active damper control and output a first signal X representing a vibration acceleration that acts on the vehicle body 30 to the ECU 60. The monitoring sensor 52 is provided to monitor the detecting sensor 51 and output a second signal Y representing the vibration acceleration that acts on the vehicle body 30 to the ECU 60.

Figure 2:
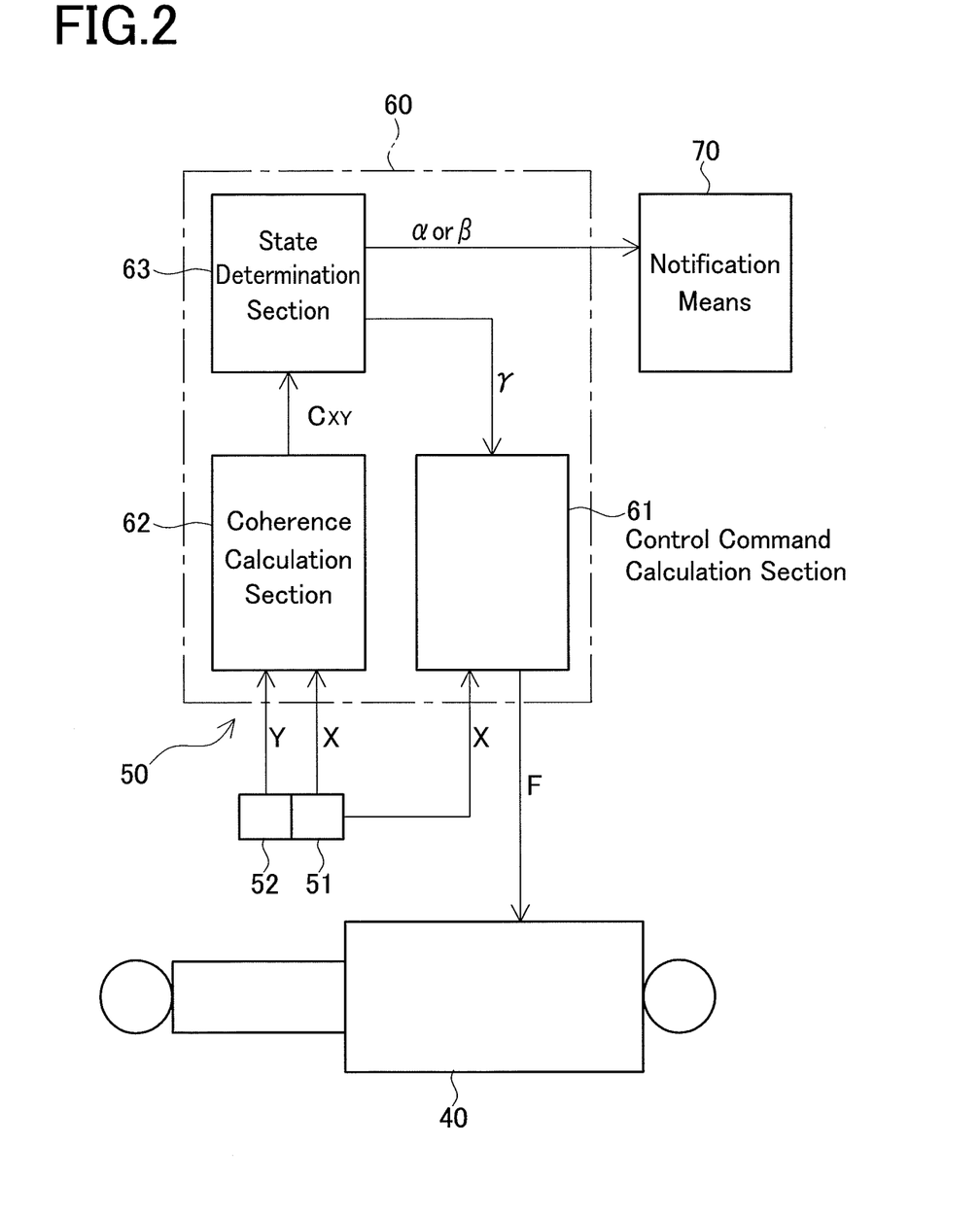
FIG. 2 is a diagram showing a relationship between an electronic control unit, a damper unit, and a notification means shown in FIG. 1.

The ECU 60 is provided with a control command value calculation section 61 to compute the damper control command value F, as shown in FIG. 2. Specifically, the control command value calculation section 61 calculates an optimal damper control command value F based on the first signal X input from the detecting sensor 51 while the vehicle body 30 is vibrating to the right and left, and outputs the calculated damper control command value F to the damper unit 40. Accordingly, the damper unit 40 actively generates the damping force, thereby performing the active damper control.

Meanwhile, when the detecting sensor 51 is in a normal state, the active damper control is executed based on the first signal X which is normal. Thus, the vibration damping control is appropriately executed to improve the ride quality or comfort. To the contrary, when the detecting sensor 51 is in an abnormal state, or is broken, the active damper control is executed based on the first signal X which is abnormal. Thus, the vibration damping control is not appropriately executed, which may result in a deterioration of ride quality. Therefore, when the detecting sensor 51 is in the abnormal state, it is preferable not to execute the active damper control. The case where the detecting sensor 51 is abnormal includes for example a case where a connector of the detecting sensor 51 is about to be disengaged, a case where wiring of the detecting sensor 51 is cut, and other cases.

In the present embodiment, therefore, for the purpose of determining whether or not the detecting sensor 51 is in the abnormal state, the monitoring sensor 52 is installed in to a location equivalent to the location of the detecting sensor 51, and the ECU 60 is provided with a coherence calculation section 62 and a state determination section 63 both serving as a determination means. The coherence calculation section 62 is arranged to compute a coherence value CXY representing a correlationship between the first signal X and the second signal Y, based on the signals X and Y.

Herein, a coherence value C(f) generally defined will be explained. This coherence value C(f) is a value indicating how much two signals x(t) and y(t) are correlated. The coherence value C(f) is defined by expression 1:

$$C(f) = \frac{|S_{xy}(f)|^2}{S_x(f) * S_y(f)} \quad \text{(Expression 1)}$$

where Sxy(f) is a cross spectrum of x(t) and y(t) and is expressed by Fourier transformation of the cross-correlation function of x(t) and y(t), Sx(f) is a power spectrum of x(t) and is expressed by Fourier transformation of a autocorrelation function of x(t), and Sy(f) is a power spectrum of y(t) and is expressed by Fourier transformation of a autocorrelation function of y(t). Further, t denotes time and f denotes frequency.

The coherence calculation section 62 calculates a coherence value CXY between the first signal X and the second signal Y by use of expression 2 obtained by expanding expression 1:

$$C_{XY} = \frac{|\{\Sigma(X - Xa) * (Y - Ya)\}| * |\Sigma(X - Xa) * (Y - Ya)|}{\Sigma(X - Xa)^2 * \Sigma(Y - Ya)^2} \quad \text{(Expression 2)}$$

where the first signal X detected at every 4 milliseconds by the detecting sensor 51 is input into X in expression 2, the second signal Y detected at every 4 milliseconds by the monitoring sensor 52 is input into Y in expression 2. Furthermore, Xa in expression 2 is an average value of the first signal X detected at every 0.1 second, Ya in expression 2 is an average value of the second signal Y detected at every 0.1 second. It is to be noted that the time for which the first signal X and the second signal Y are input is not limited to the above interval of 4 milliseconds and may be changed as needed. The time interval to calculate the average values Xa and Ya is not limited to the above interval of 0.1 second and may be changed as needed according to the magnitude of frequency.

The coherence value CXY calculated by expression 2 is a value from 0 to 1. This is 1 when the first signal X and the second signal Y completely coincide with each other and is 0 when the first signal X and the second signal Y are not correlated. In other words, the coherence value CXY is a value indicating how much the first signal X and the second signal Y are similar in shape at every 0.1 second.

The state determination section 63 is arranged to monitor the coherence value CXY calculated at every 0.1 second and determine whether or not this coherence value CXY is smaller than 0.6 which is an abnormality determination value. If the coherence value CXY is equal to or larger than 0.6, this state determination section 63 determines that the shape of the first signal X is similar to the shape of the second signal Y and thus that the detecting sensor 51 is in a normal state. If the coherence value CXY is smaller than 0.6, to the contrary, the state determination section 63 determines that the shape of the first signal X is dissimilar to the shape of the second signal Y and thus that the detecting sensor 51 is in an abnormal state.

In the present embodiment, the state determination section 63 is configured to determine that the detecting sensor 51 is in an abnormal state when the condition of the coherence value CXY being smaller than 0.6 has been successively established multiple times (e.g., ten times). This is to prevent the detecting sensor 51 from becoming determined to be in abnormal state when the coherence value CXY is smaller than 0.6 only once by influence of the noise input in the detecting sensor 51 and the monitoring sensor 52.

The state determination section 63 is further configured to determine whether or not the coherence value CXY is always smaller than 0.8 which is a normality determination value set in advance, for a short time (e.g., 10 seconds) from the start of running of the railroad vehicle 1. This is to determine whether or not the detecting sensor 51 is in a normal state immediately after the railroad vehicle 1 starts running. The state determination section 63 is also configured to determine whether or not the detecting sensor 51 is in an abnormal state based on the coherence value CXY only when the railroad vehicle 1 is running. This is because when the railroad vehicle 1 is being stopped, the first signal X and the second signal Y are inherently "0" and the coherence value CXY is not calculated.

Furthermore, the state determination section 63 is configured to output a normality signal α to the notification means 70 when the state determination section 63 determines that the detecting sensor 51 is in a normal state. Based on this normality signal α, the notification means 70 turns on for example a blue lamp to notify a driver or motorman that the detecting sensor 51 is in a normal state. On the other hand, the state determination section 63 is configured to output an abnormality signal β to the notification means 70 when the state determination section 63 determines that the detecting sensor 51 is in an abnormal state. Based on this abnormality signal β, the notification means 70 turns on for example a red lamp to notify a driver or motorman that the detecting sensor 51 is in an abnormal state.

Furthermore, the state determination section 63 is arranged to output an OFF signal γ to the control command value calculation section 61 only when the state determination section 63 determines that the detecting sensor 51 is in an abnormal state. Based on this OFF signal γ, the control command value calculation section 61 turns the damper control command value to "0" to inhibit the active damper control, thereby placing the damper unit 40 into a passive state.

Figure 3:
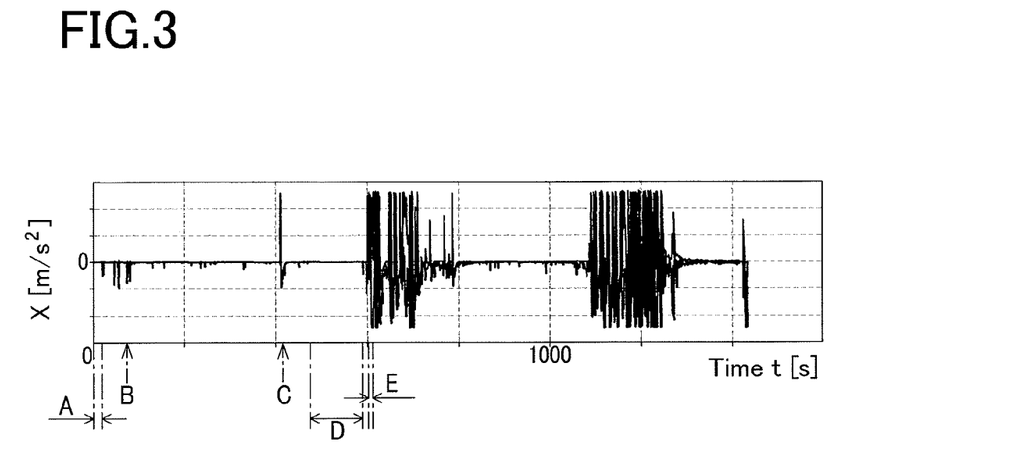
FIG. 3 is a graph showing a relationship between elapsed time from the start of running of the railroad vehicle and a first signal detected by a detecting sensor.
Figure 4:
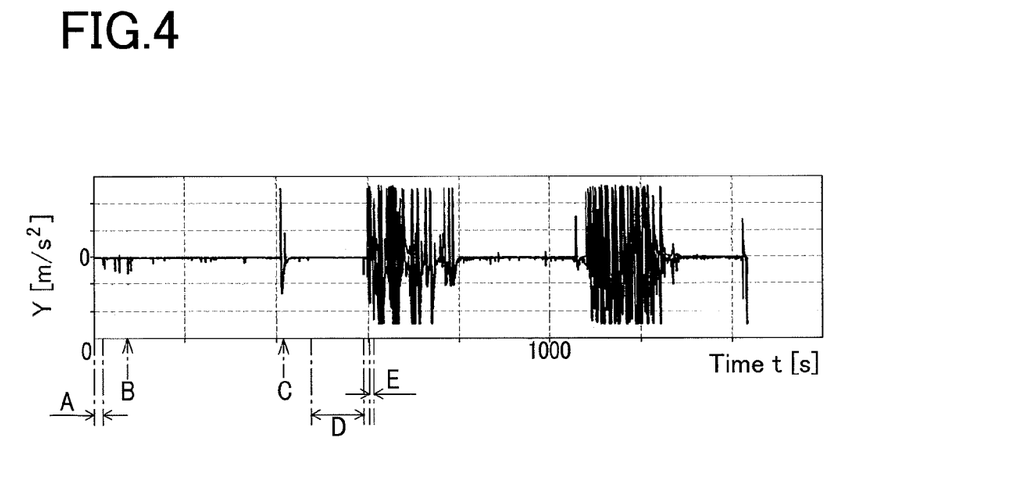
FIG. 4 is a graph showing a relationship between elapsed time from the start of running of the railroad vehicle and a second signal detected by a monitoring sensor.
Figure 5:
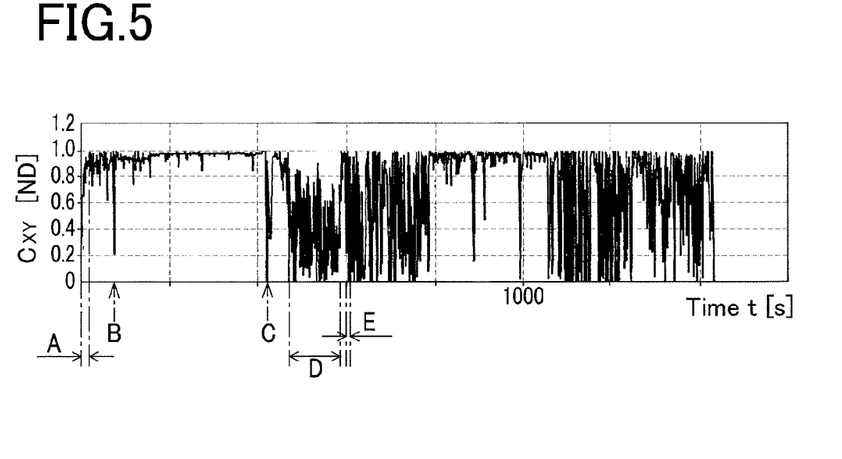
FIG. 5 is a graph showing a relationship between elapsed time from the start of running of the railroad vehicle and coherence value.
Figure 6:
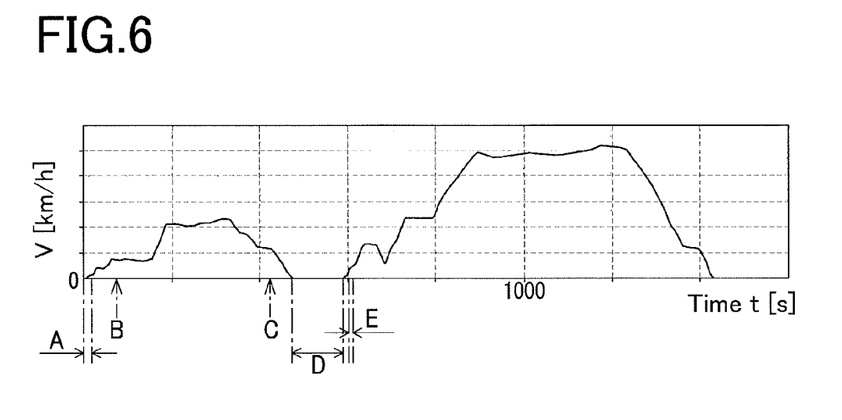
FIG. 6 is a graph showing a relationship between elapsed time from the start of running of the railroad vehicle and running speed.
Figure 7:
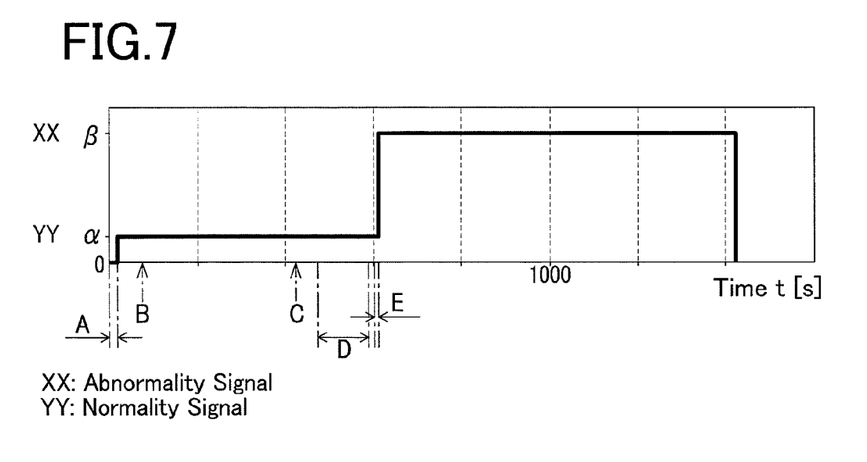
FIG. 7 is a graph showing a relationship between elapsed time from the start of running of the railroad vehicle and a normal signal or abnormal signal output from a state determination section.

The operations and effects of the embodiment configured as above will be explained using experimental results shown in FIGS. 3 to 7. FIG. 3 shows a relationship between elapsed time t from the start of running of the railroad vehicle 1 and the X signal detected by the detecting sensor 51. FIG. 4 shows a relationship between the elapsed time t and the Y signal detected by the monitoring sensor 52. FIG. 5 shows a relationship between the elapsed time t and the coherence value CXY. FIG. 6 shows a relationship between the elapsed time t and running speed V of the railroad vehicle 1. FIG. 7 shows a relationship between the elapsed time t and the normality signal α or the abnormality signal β, each of which is output from the state determination section 63.

In FIG. 5, with reference to a short time A (10 seconds) from the start of running of the railroad vehicle 1, it is found that the coherence value CXY is larger than 0.8. Accordingly, the state determination section 63 determines that the detecting sensor 51 is in a normal state and outputs the normality signal α to the notification means 70 as shown in FIG. 7. Thus, immediately after the railroad vehicle 1 starts running, it is possible to inform the driver or motorman or others that no initial failures exist in the detecting sensor 51.

In FIG. 5, referring to time B and time C, the coherence value CXY is found to be smaller than 0.6. At the time B and the time C, however, the condition that the coherence value CXY is smaller than 0.6 has not been satisfied multiple times N (ten times) in succession. Accordingly, the detecting sensor 51 is not determined to be in an abnormal state and thus is determined to be in a normal state (see FIG. 7). Consequently, it is possible to prevent the detecting sensor 51 from becoming determined to be in an abnormal state due to the influence of noise input in the detecting sensor 51 and the monitoring sensor 52.

In FIG. 5, furthermore, referring to a certain time period D for which the vehicle running speed V is "0" (see FIG. 6), it is confirmed that the coherence value CXY is smaller than 0.6. However, in this time period D which is a time zone in which the railroad vehicle 1 is being stopped, the state determination section 63 does not determine whether or not the detecting sensor 51 is in an abnormal state based on the coherence value CXY as described above. In the time D, therefore, a determination result that the detecting sensor 51 is in a normal state is maintained. It is to be noted that the coherence value CXY largely varies in the time D due to the influence of noise input in the detecting sensor 51 and the monitoring sensor 52.

In FIG. 5, referring to a time period E, the condition that the coherence value CXY is smaller than 0.6 has been successively satisfied multiple times N (ten times). At that time, the state determination section 63 determines that the detecting sensor 51 is in an abnormal state and outputs the abnormality signal β to the notification means 70 as shown in FIG. 7. Accordingly, the abnormal state of the detecting sensor 51 can be notified to the driver or motorman, or others. At this time, the state determination section 63 outputs the OFF signal γ to the control command value calculation section 61 to place the damper unit 40 into a passive state. Consequently, the active damper control is not executed while the detecting sensor 51 is in an abnormal state, thereby enabling prevention of deterioration in ride quality.

Meanwhile, the ECU may be configured to make a determination without using the coherence value CXY that the detecting sensor 51 is in an abnormal state when a difference in amplitude or a difference in power between the first signal X and the second signal Y is a predetermined value or higher. In this configuration, however, the first signal X and the second signal Y are compared in amplitude or power at every certain moment. When random noise is input in the detecting sensor 51 and the monitoring sensor 52, therefore, it is difficult to accurately determine whether or not the detecting sensor 51 is in an abnormal state.

On the other hand, the ECU 60 in the present embodiment is arranged to determine that the detecting sensor 51 is in an abnormal state when the coherence value CXY indicating the correlation degree of the first signal X and the second signal Y is smaller than the abnormality determination value. The ECU 60 thus compares the shape of the first signal X and the shape of the second signal Y at intervals of a predetermined time (0.1 second). This enables strictly comparing the first signal X and the second signal Y even when random noise is input in the detecting sensor 51 and the monitoring sensor 52, as compared with the case of comparing the first signal X and the second signal Y in amplitude or power at every certain moment. Accordingly, it is possible to accurately determine whether or not the detecting sensor 51 is in an abnormal state.

The above explanation is given to the sensor state determination system 50 according to the invention, but the invention is not limited thereto. The present invention may be embodied in other specific forms without departing from the essential characteristics thereof.

For instance, although the above embodiment uses the aforementioned expression 2 to calculate or compute the coherence value CXY, an expression to calculate the coherence value CXY is not limited to expression 2. Accordingly, for example, the coherence value CXY may be calculated using expression 3 described below.

$$C_{XY} = \frac{\{\Sigma(X-Xa)*(Y-Ya)\} * |\sum(X-Xa)*(Y-Ya)|}{\Sigma(X-Xa)^2 * \sum(Y-Ya)^2} \quad \text{(Expression 3)}$$

The above expression 3 is an expression obtained by removing an absolute value from the numerator of the above expression 2. In the case of using this expression 3, the coherence value CXY is a value from −1 to 1. When a phase is displaced 180 degrees, the coherence values CXY are a predetermined positive value and a predetermined negative value (e.g., 1 and −1). On the other hand, in the case of using the expression 2 including an absolute value in the numerator, the coherence value CXY is a value from 0 to 1. Even when the phase is displaced 180 degrees, accordingly, both the coherence values CXY become a predetermined positive value (e.g., 1). Thus, in the case of using the expression 3, it is possible to further take into consideration a negative value of the coherence value CXY based on the phase displacement. This enables strict comparison between the first signal X and the second signal Y.

An expression to calculate the coherence value CXY may also be the following expression 4 simpler than the expression 3.

$$C_{XY} = \frac{\Sigma(X*Y) * |\Sigma(X*Y)|}{\sum X^2 * \sum Y^2} \quad \text{(Expression 4)}$$

In the present embodiment, furthermore, the short time period A (10 seconds) from the start of running of the railroad vehicle 1, the abnormality determination value (0.6), the normality determination value (0.8), and the aforementioned multiple times N (ten times) are determined in advance by experiments and may be changed as needed. As an alternative, the abnormality determination value and the normality determination value may coincide with each other.

In the present embodiment, the sensor state determination system 50 may also be configured to determine that the detecting sensor 51 is in an abnormal state when the condition that the coherence value CXY is smaller than the abnormality determination value (0.6) has been established once, that is, at the time B shown in FIG. 5.

In the present embodiment, the sensor state determination system 50 determines that the detecting sensor 51 is in an abnormal state when the condition that the coherence value CXY is smaller than the abnormality determination value has been established ten times in succession. As an alternative, for example, the sensor state determination system 50 may be configured to determine that it is in an abnormal state with small or slight failure when the condition that the coherence value CXY is smaller than the abnormality determination value has been established ten or more times in succession but less than twenty times and that it is in an abnormal state with large or severe failure when the condition that the coherence value CXY is smaller than the abnormality determination value has been established twenty or more times in succession.

In the present embodiment, the sensor state determination system 50 is configured to determine whether or not the acceleration sensor (the detecting sensor 51) used in the vibration damping control system is in an abnormal state. As an alternative, the sensor state determination system may be configured to determine whether or not the acceleration sensor and others used in the state monitoring system that monitors the state of components of the railroad vehicle or monitors the ride quality is in an abnormal state or may be configured to determine whether or not various sensors used for control of the vehicle are in abnormal states.

The detecting sensor 51 and the monitoring sensor 52 in the present embodiment are the acceleration sensors for detecting vibration damping acceleration in right-left directions. As an alternative, they may be an acceleration sensor for detecting vibration damping acceleration in up-down directions or in front-back directions, or a biaxial acceleration sensor or a triaxial acceleration sensor. Furthermore, the detecting sensor 51 and the monitoring sensor 52 may be selected from a speed sensor, an angle sensor, an angular speed sensor, a displacement sensor, a pressure sensor, etc. The detecting sensor 51 and the monitoring sensor 52 installed in the vehicle body 30, but may be installed in any part or location of the railroad vehicle 1.

REFERENCE SIGNS LIST

1 Railroad vehicle
10 Bogie
20 Air spring
30 Vehicle body
40 Damper unit
50 Sensor state determination system
51 Detecting sensor
52 Monitoring sensor
60 Electronic control unit (ECU)
61 Control command value calculation section
62 Coherence calculation section
63 State determination section
70 Informing means

The invention claimed is:

1. A sensor state determination system for determining whether a sensor is in an abnormal state during running of a railroad vehicle, comprising:
a detecting sensor capable of detecting a physical value acting on the railroad vehicle,
a monitoring sensor equivalent to the detecting sensor, wherein the monitoring sensor is installed in a location that is equivalent to a location in which the detecting sensor is installed, and
an electronic control unit including a determination means, the determination means including a state determination section, a coherence calculation section and a control command calculation section, wherein the ECU is configured to calculate a coherence value representing a correlation between a first signal detected by the detecting sensor and a second signal detected by the monitoring sensor based on both the signals, and configured to determine that the detecting sensor is in an abnormal state when the coherence value is smaller than an abnormality determination value set in advance,
wherein the monitoring sensor is configured to output the same signal values as the detecting sensor, and
the coherence value is calculated from a coherence function based on the first signal and the second signal.

2. The sensor state determination system according to claim 1, wherein the electronic control unit is configured to determine that the detecting sensor is in an abnormal state when a condition that the coherence value is smaller than the abnormality determination value has been established multiple times in succession.

3. The sensor state determination system according to claim 1, wherein the electronic control unit is configured to determine that the detecting sensor is in an abnormal state when a condition that the coherence value is always smaller than a normality determination value for a short time from start of running of the railroad vehicle.

4. The sensor state determination system according to claim 2, wherein the electronic control unit is configured to determine that the detecting sensor is in an abnormal state when a condition that the coherence value is always smaller than a normality determination value for a short time from start of running of the railroad vehicle.

* * * * *